United States Patent [19]

Gorbaty

[11] 4,113,615

[45] Sep. 12, 1978

[54] METHOD FOR OBTAINING SUBSTANTIALLY COMPLETE REMOVAL OF PHENOLS FROM WASTE WATER

[75] Inventor: Martin L. Gorbaty, Fanwood, N.J.

[73] Assignee: Exxon Research & Engineering Co., Linden, N.J.

[21] Appl. No.: 637,443

[22] Filed: Dec. 3, 1975

[51] Int. Cl.$^2$ .......................... C02B 1/14; C02C 5/02
[52] U.S. Cl. .......................... 210/40; 55/85; 252/417
[58] Field of Search .................. 48/202, 210; 210/39, 210/40; 252/413, 417, 418; 55/84, 85

[56] References Cited

U.S. PATENT DOCUMENTS

| 2,809,938 | 10/1957 | Goren et al. | 210/39 |
|---|---|---|---|
| 3,424,676 | 1/1969 | Johnson et al. | 210/40 |
| 3,620,700 | 11/1971 | Schlinger et al. | 210/40 |
| 3,892,661 | 7/1975 | Siviour et al. | 210/40 |

OTHER PUBLICATIONS

Short et al., "Controlling Phenols in Refinery Waste Waters," *The Oil & Gas Journal* 72, No. 47, pp. 119-124, Nov. 25, 1974.
Frum, R. W., "Sewage Treatment with Coal and Coal Related Wastes," Technical Report #94, Coal Research Bureau, West Virginia University.
Kipling, "The Adsorption of Acetic Acid and n-Butylamine," *Chemical Society Journal*, No. 43, pp. 1483-1487 (1948).
Voreck et al., "Extraction of Mercaptans by Means of Adsorption," *Petroleum Refiner*, vol. 30, No. 3, pp. 126-129, Mar. 1951.

*Primary Examiner*—Charles N. Hart
*Assistant Examiner*—Ivars Cintins
*Attorney, Agent, or Firm*—Jale S. Finkle

[57] ABSTRACT

The substantially complete removal from waste water of phenols and other organic compounds that dissociate in solution to produce organic anions and hydrogen ions is obtained by contacting the waste water with char derived from a carbonaceous material whose ash contains a total of at least 15 weight percent calcium, magnesium, potassium and sodium expressed as oxides on a moisture-free basis while maintaining the pH of the resultant slurry at a value such that the ratio of the highest dissociation constant of the organic compounds present to the hydrogen ion concentration of the slurry is less than about 0.1. By adjusting the pH to such a level, the phenols and other organic compounds are maintained in their nonionized, more adsorbable form which insures the substantially complete adsorption of these substances by the char.

15 Claims, 2 Drawing Figures

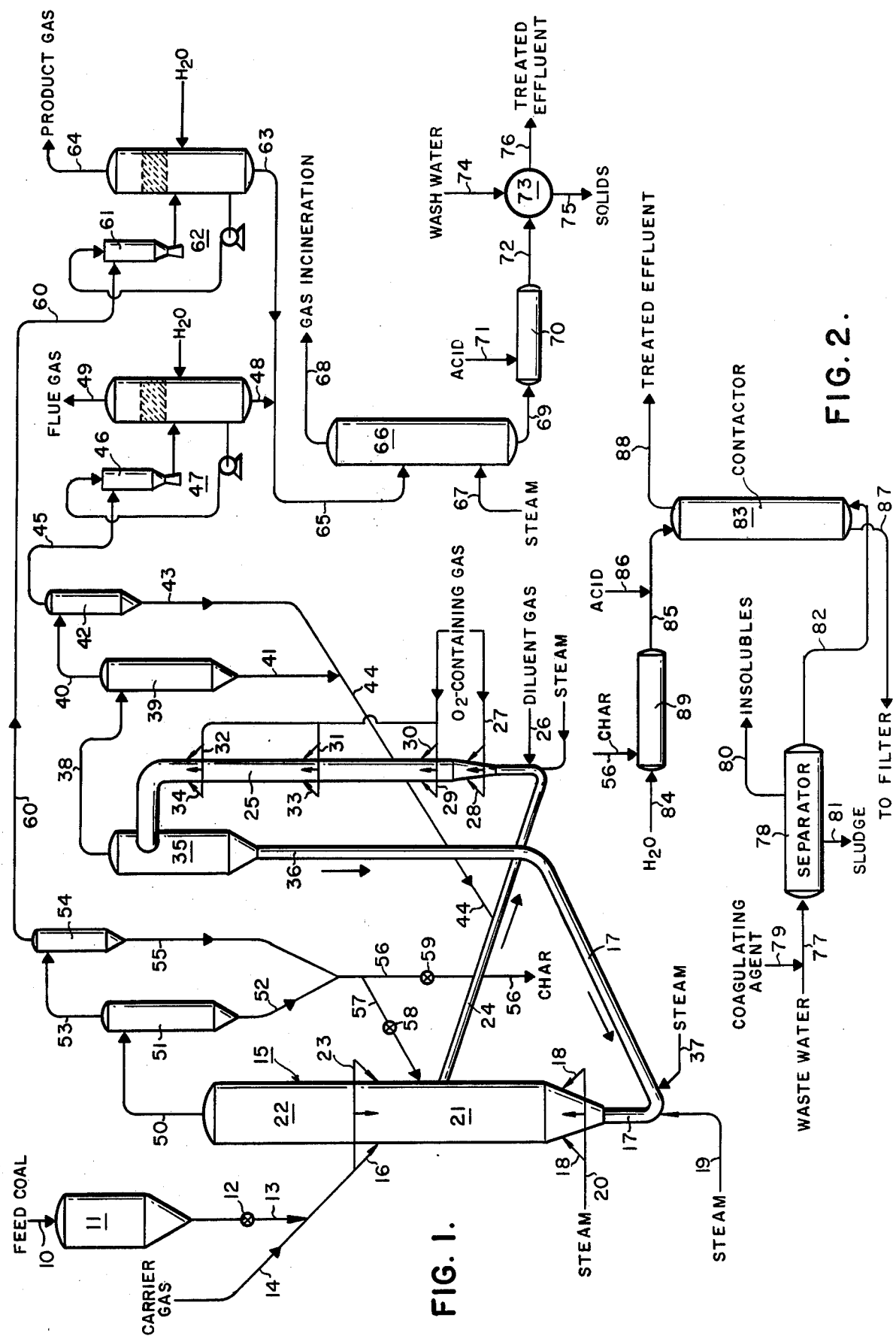

METHOD FOR OBTAINING SUBSTANTIALLY COMPLETE REMOVAL OF PHENOLS FROM WASTE WATER

BACKGROUND OF THE INVENTION

1. Field of the Invention

This invention relates to the removal of phenols and other organic compounds from waste waters and is particularly concerned with a method for obtaining the substantially complete removal of these substances by adsorption onto char.

2. Description of the Prior Art

Over a period of the last several years, restrictions on the amount and types of organic materials that may be discharged into the environment have become more severe. In an effort to meet these restrictive standards, there has been a considerable increase in the amount of research and development work devoted to pollution control. One area of considerable activity has been investigations into the use of activated carbon and similar substances as adsorbents for the treatment of waste water containing organic pollutants.

A method commonly employed today for removing organic contaminants from waste water is biological treatment. This technique consists of vigorously aerating the waste water to allow bacteria to carry on their metabolic activity thereby breaking down residual suspended solids and dissolved organic materials by bacterial action. Biological treatment, however, has a serious disadvantage. Industrial waste water normally contains large amounts of nonbiodegradable pollutants which, along with toxic materials present, inhibit or destroy the bacteria thus rendering the biological treatment ineffective.

Studies indicate that the adsorption of organic pollutants by activated carbon is a commercially viable means of treating municipal and industrial waste water which is more effective than biological treatment because the activated carbon will adsorb both biodegradable and nonbiodegradable organic substances in such quantities as to meet present and proposed effluent standards. In addition to using activated carbon for treating municipal sewage and waste water from industrial installations such as refineries and chemical plants, it has also been shown that activated carbon can effectively treat waste water from coking and coal gasification plants. The optimum performance of such an adsorption system has been obtained by proper adjustment of the waste water pH before contact with the activated carbon so that dissolved organic contaminants are in their nonionized and more adsorbable form. The activated carbon will have little or no effect on the waste water pH.

Recent development work, sponsored by the Office of Coal Research, has indicated that certain types of chars, the carbonaceous product resulting from the thermal processing of coal in those cases where the coal is not completely consumed or converted, exhibit adsorption properties similar to commercially available activated carbon and suggests that these chars may be used to treat waste water. This knowledge may be of vital importance in the near future as commercial gasification and liquefaction plants are built. These facilities will produce industrial waste water containing many diverse types of organic substances including cresols, naphthol, phenol and the like. In addition gasification plants utilizing fluid bed gasifiers may generate a large amount of char fines which may contain up to 20 percent of the carbon fed to the gasifier. The use of these char fines as adsorbents to treat the waste effluent from a gasification plant, a liquefaction plant or from other sources will enhance the economics of the gasification process by utilizing the unconverted carbon remaining in the char fines while decreasing the cost of waste water treatment by obviating the need for expensive activated carbon.

SUMMARY OF THE INVENTION

This invention provides an improved process for the treatment of waste water with char. In accordance with the invention, it has now been found that substantially complete removal from waste water of phenols and other organic compounds that dissociate in solution to produce organic anions and hydrogen ions can be obtained by contacting the waste water with char derived from a carbonaceous material whose ash contains a total of at least 15 weight percent calcium, magnesium, potassium and sodium expressed as oxides on a moisture free basis, maintaining the pH of the resultant slurry at a value such that the ratio of the highest dissociation constant of the organic compounds present to the hydrogen ion concentration of the slurry is less than about 0.1, and recovering purified waste water.

The pH of the char-waste water slurry may be maintained at the desired level either by adding mineral acid directly to the slurry or the char before it is contacted with the waste water. The waste water may originate from many different sources and may, for example, be an aqueous effluent from sewage treatment plants, refineries, chemical plants, gasification plants and similar industrial installations. The char suitable for use as the adsorbent may be any carbonaceous product resulting from the partial thermal processing of coal or other carbonaceous material whose ash contains at least 15 weight percent calcium, magnesium, potassium and sodium expressed as oxides on a moisture free basis. Thus, the char may, for example, be the carbonaceous product obtained from the carbonization, gasification, pyrolysis or liquefaction of coal. It is particularly advantageous to use char fines carried overhead with the product gas produced in a fluid bed gasifier as the adsorbent. Such utilization of the unconverted carbon in the fines enhances the economics of both the gasification process and the waste water treating process.

Laboratory work has surprisingly shown that when char fines derived from the gasification of certain Wyodak coals are slurried in distilled water, the pH of the resultant slurry substantially increases and may reach values greater than 10.0. Further, it has been shown that a pH of this magnitude has a deleterious effect on the amount of dissolved phenol which is adsorbed by the char fines. The high pH of the slurry causes the phenol to dissociate in solution to produce hydrogen ions and the less adsorbable phenoxide ions. It has been observed that this behavior can decrease adsorption as much as about 30 percent. It has, however, been found that adsorption of phenol can be maintained at near optimum levels by preventing the pH of the char fines-waste water slurry from rising above a value of about 8.0. The increase in pH is apparently caused by the hydrolysis of calcium, magnesium, potassium and sodium containing compounds in the char fines when they are slurried with the waste water.

BRIEF DESCRIPTION OF THE DRAWING

FIG. 1 is a schematic flow diagram of a preferred process for the gasification of coal or similar carbonaceous solids carried out in accordance with the invention; and FIG. 2 is a schematic flow diagram of a preferred process for treating waste water carried out in accordance with the invention.

DESCRIPTION OF THE PREFERRED EMBODIMENTS

The process depicted in FIG. 1 is one for the production of a synthetic gas by the fluid bed gasification of bituminous coal, subbituminous coal, lignite or similar carbonaceous solids with steam at high temperatures to produce a product gas stream containing methane. It will be understood that the invention is not restricted to the particular process shown in FIG. 1 but can be used in conjunction with other processes that include the removal of phenols and other organic acids from waste water by treating the waste water with particles of char. An example of such a process is depicted in FIG. 2 and described in detail hereafter.

In the process shown in FIG. 1, the solid feed material is introduced into the system through line 10 from a preparation plant, not shown, in which the coal or other material may be crushed, dried and screened or from a storage facility which does not appear in the figure. To facilitate handling of the solid feed material in the fluidized state, the coal or other carbonaceous solid is introduced into the system in a finely divided state, normally less than about 8 mesh on the U.S. Sieve Series Scale. If desired, this coal may be impregnated or mixed with an alkali metal constituent which serves to catalyze the gasification reaction.

The system shown in FIG. 1 is operated at elevated pressures and hence the coal introduced through line 10 is fed into vessel 11, from which it is discharged through star wheel feeder or similar device 12 into line 13 at the system operating pressure or a slightly higher pressure. Other equipment can be used to raise the input coal stream to the required pressure level. The use of such equipment for handling coal and other finely divided solids at elevated pressures has been described in the patent literature and will therefore be familiar to those skilled in the art.

A carrier gas, which may be high pressure steam, product gas, flue gas or the like, is injected into feed line 14 where it entrains the feed coal particles and carries them into gasifier 15. The use of recycle product gas tends to avoid significant reductions in the hydrogen concentration in the gasifier and improve methane yields and is therefore normally preferred. The carrier gas is introduced into the system at a pressure between about 50 and about 1000 pounds per square inch gauge, depending in part upon the pressure at which gasifier 15 is operated and the nature of the solid feed material utilized.

The feed stream containing the coal or other material is introduced into the gasifier through one or more nozzles. A fluid, such as low pressure steam, may be circulated in the nozzles for cooling purposes or injected into the gasifier around the stream of feed gas and entrained solids to control entry of the solids into the fluidized bed in the gasifier. In the system shown in FIG. 1, the gas and entrained solids flow into injection manifold 23 and then pass into the gasifier through four injection nozzles 16 spaced about the gasifier periphery. The number of injection lines and nozzles employed will depend in part on the gasifier diameter and the feed rates used and may be varied as necessary. Similarly, the level at which the coal or other solid feed material is introduced through the nozzles into the gasifier will depend in part upon the characteristics of the particular feed materials selected and other factors. In the system shown, the solids are introduced at an intermediate level but in other cases may be injected at or near the top or bottom of the gasifier.

The gasifier vessel 15 utilized in the system depicted in FIG. 1 contains a fluidized bed of char particles which are introduced into the lower part of the vessel through line 17. Steam for reacting with the char and maintaining the particles in a fluidized state is introduced through manifold 20 and lines 18 and 19. The total steam rate will normally vary between about 0.5 and about 2.0 pounds of steam per pound of coal feed. The upflowing steam and char form a fluidized bed that extends upwardly in the gasifier to a level above that at which the coal or other solid feed particles are introduced with the gas from line 14. The lower portion of the gasifier, indicated by reference number 21, serves as a steam gasification zone. It is here that the steam introduced through lines 18 and 19 reacts with the carbon in the hot char to form synthesis gas in accordance with the reaction: $H_2O + C \rightleftarrows H_2 + CO$. At the bottom of the reactor, the hydrogen concentration in the gaseous phase in the fluidized bed is essentially zero. As the steam ascends through the fluidized char particles, it reacts with the carbon, and the hydrogen concentration in the gaseous phase increases. The temperature in steam gasification zone 21 will normally range between about 1450° and about 1800° F. The gas velocities in the fluidized bed will vary between about 0.2 and about 3.0 feet per second.

The upper part of the fluidized bed in reactor vessel 15, which is designated by reference number 22, serves as a hydrogasification zone. Here the feed coal is devolatilized and a part of the volatile matter produced reacts with the hydrogen generated in zone 21 to produce methane as one of the principal products. The point at which the coal feed stream is introduced into the gasifier and thus the location of the steam gasification and hydrogasification zones depends primarily upon the properties of the particular coal which is employed as the feedstock. It is generally preferred to maximize the methane yield from the gasifier and minimize the tar yield. Generally speaking, the amount of methane produced increases as the coal feed injection nozzle is moved nearer the top of the reactor. The tar, which has a tendency to foul downstream processing equipment, generally increases as the coal injection point is moved upwardly in the gasifier and decreases as the coal input point is moved nearer the bottom of the reactor, other operating conditions remaining constant. The coal feed will normally be injected into gasifier 15 at a point where the hydrogen concentration in the gas phase is in excess of about 15% by volume, preferably between 25% and 50% by volume.

The upper surface of the fluidized bed will normally be located at a level sufficiently above the feed injection point to provide at least 4 seconds of residence time for the gas phase in contact with the fluidized solids in the hydrogasification zone 22. It is preferred in general that the residence time for the gas in contact with the solid phase above the point of coal feed injection be between about 7 and about 20 seconds. It will be understood, of course, that the optimum hydrogen concentration at the coal injection point and gas residence time above the point of coal injection will vary with different types and compositions of feed coal and with variations in the gasifier temperature, pressure, steam rate, and other processing conditions. Higher rank coals normally require somewhat more severe reaction conditions to obtain practical reaction rates than do coals of lower rank. Similarly, higher reactor temperatures and steam rates normally tend to increase the hydrogen concentration in the gas phase and thus reduce the solids residence time required for gasification of a given coal feed.

As previously discussed, the temperature in gasifier 15 is normally maintained between about 1450° and about 1800° F. The heat required to sustain the overall endothermic reaction taking place in the gasifier and maintain this operating temperature is provided by withdrawing a portion of the char solids from the fluidized bed through line 24 and passing this material into the lower end of transfer line burner 25. Steam may be injected into line 24 in the vicinity of the bend in order to promote smooth flow of the solids and avoid any danger of clogging. Similarly, a diluent gas, flue gas for example, may be injected through line 26 to further aid in suspending the solids and entraining them in dilute phase flow as they rise through the transfer line burner. An oxygen-containing gas, preferably a mixture of air and sufficient recycle flue gas to give a molecular oxygen content of less than about 10% by volume, is introduced into the lower end of the burner through manifold 27 and peripherally spaced injection lines 28 in a quantity sufficient to establish dilute phase flow of the solids and initiate combustion of the char particles.

The use of a gas of relatively low oxygen content at the lower end of the burner aids in avoiding the formation of hot spots which may result in localized temperatures that exceed the ash fusion temperature and may lead to the formation of deposits and fouling of the burner. Oxygen-containing gas having a higher molecular oxygen content than that introduced in the lower end of the burner may be supplied to the burner through manifold 29 and peripherally spaced injection lines 30. It is preferable to introduce the additional oxygen-containing gas at two or more vertically spaced levels along the burner in order to achieve a better control of the combustion process and again avoid localized overheating and the problems that may accompany it. In the system shown in FIG. 1, air or other oxygen-containing gas is introduced at two additional levels by means of manifolds 31 and 32 and peripherally spaced injection lines 33 and 34. The levels at which the oxygen-containing gas is introduced into the burner are generally sufficiently separated so that substantially all the oxygen introduced at one level is consumed before the gas and entrained solids reach the next level. This generally provides better control of the temperatures within the burner, results in more efficient combustion, and reduces the carbon monoxide content of the flue gas stream. The total amount of oxygen introduced in this manner will be sufficient to raise the temperature of the solids passing upwardly through the burner by about 50° F. to about 300° F. and thus provides sufficient heat upon the return of the solids to the gasifier through dipleg 36 and line 17 to maintain the gasification reactions.

The gases and entrained solids leaving the upper portion of transfer line burner 25 are passed into a cyclone separator or similar separation unit 35 where the larger solids are removed from the gas stream and returned through dip leg 36 to the gasifier bottom intake line 17. Steam may be introduced into the solids return system through line 37, if desired, to promote proper flow of the solids stream and avoid clogging difficulties. The hot char particles thus returned to the gasifier provide the heat required to sustain both the steam gasification reaction taking place in steam gasification zone 21 and the hydrogasification reactions taking place in hydrogasification zone 22.

The overhead gas from separator 35 will contain fine particles of char. To remove these particles from the flue gas, the separator overhead is fed through line 38 to primary burner cyclone separator or similar device 39 where entrained fine solids are removed and conveyed downwardly through dip leg 41. The raw gas taken overhead from separator 39 is passed through line 40 into secondary burner cyclone separator or similar unit 42 where additional fines are removed and passed downwardly through dip leg 43. The fines removed via dip legs 41 and 43 may be combined in line 44 and fed into line 24 for reintroduction into transfer line burner 25.

The overhead flue gas stream leaving separator 42, which still contains entrained fine particles of char, is passed through line 45 to venturi scrubbing system or similar unit including venturi scrubber 46 and circulating water pumparound system 47. Here the flue gas is scrubbed with water and the fines removed from the gas are recovered as a slurry. The slurry exits the pumparound system through line 48 while the scrubbed flue gas leaves the system for further processing through line 49.

The overhead product gas stream leaving gasifier 15 through line 50 will normally also contain a substantial concentration of fine char particulates. The product gas is handled in a manner similar to that of the flue gas. The gasifier overhead is fed through line 50 to primary cyclone separator or similar unit 51 where the larger entrained solids are separated from the gas. The solids removed from the gas in separator 51 are conveyed downwardly through dip leg 52. The overhead gas from separation unit 51 is passed through line 53 to secondary cyclone separator or similar unit 54 where additional entrained solids are removed from the gas. The fines thus recovered are passed downwardly through dip leg 55 and may be combined in line 56 with the solids from dip leg 52. The fine particles of char thus recovered and passed into line 56 may be returned to the gasifier via line 57 and valve 58 or they may be passed through line 56 and valve 59 to a downstream unit where they may be utilized for treating waste water containing phenols and other organic pollutants. An example of such a waste water treating unit is depicted in FIG. 2 and discussed in detail hereafter.

The product gas exiting separator 54 is passed through line 60 to venturi scrubbing system or similar unit including venturi scrubber 61 and circulating water pump-around system 62. Here additional fine particles of char are separated from the product gas by scrubbing it with water. The resultant slurry is removed from the pumparound system through line 63, while the scrubbed product gas leaves the system for further processing through line 64.

The composition of the product gas withdrawn from separator 54 through line 60 will depend in part upon the composition of the feed coal or other carbonaceous solids utilized in the process and the operating conditions employed. Analyses for two typical feed coals, a bituminous Illinois No. 6 coal and a subbituminous Wyodak coal, that may be employed in such a process are shown in Table I below.

TABLE I

| Coal Compositions | Illinois No. 6 Coal | Wyodak Coal |
|---|---|---|
| Ultimate Analysis Wt. % Dry Basis | | |
| Carbon | 68.0 | 68.0 |
| Hydrogen | 4.8 | 5.0 |
| Oxygen | 12.0 | 17.5 |
| Nitrogen | 1.2 | 0.9 |
| Sulfur | 4.6 | 0.7 |
| Ash | 9.4 | 7.9 |
| Total | 100.0 | 100.0 |
| Coal Ash Analysis, Wt. % Oxides, Dry Ash | | |
| $P_2O_5$ | 0.1 | 0.7 |
| $SiO_2$ | 48.8 | 27.7 |
| $Fe_2O_3$ | 22.1 | 4.8 |
| $Al_2O_3$ | 19.8 | 17.9 |
| $TiO_2$ | 0.9 | 1.3 |
| CaO | 2.4 | 20.7 |
| MgO | 0.9 | 4.8 |
| $SO_3$ | 2.1 | 18.9 |
| $Na_2O$ | 1.3 | 1.0 |
| $K_2O$ | 1.9 | 0.4 |
| Total | 100.3 | 98.2 |

The product gas exiting secondary cyclone separator 54 and the flue gas withdrawn from secondary burner cyclone separator 42 are passed through the venturi scrubbing systems to remove particulates and water soluble gasification and combustion products. The resultant product gas scrubber water-char fines slurry is removed from circulating water pumparound system 62 via line 63. The resultant flue gas scrubber water-char fines slurry is removed from circulating water pumparound system 47 via line 48. Sufficient water is fed to the pumparound systems to produce slurries containing about 5 weight percent char fines. The concentration of fines is normaly maintained at about this magnitude to facilitate pumping of the slurries.

Product gas scrubber water obtained by the countercurrent scrubbing of a char fines-free product gas with water in a packed column will normally contain trace element constituents removed from the product gas; sulfur and nitrogen compounds absorbed by the water such as ammonia, hydrogen cyanide, hydrogen sulfide, and sulfur dioxide; and oganic contaminants such as phenol, naphthol, indole, quinoline, naphthalene, phenanthrene, and the like. The product gas scrubber water will normally have an alkaline pH in the range between about 8.0 and about 9.0. Flue gas scrubber water obtained by scrubbing char fines-free flue gas in the same manner as the char fines-free product gas will normally contain trace element constituents removed from the flue gas, sulfur and nitrogen compounds in somewhat lower concentrations than the product gas scrubber water and small amounts of organic contaminants. This flue gas scrubber water will normally be acidic or neutral.

In a process of the type depicted in FIG. 1, where the coal is fed into the bottom of the gasifier, the phenol concentration of the scrubber water recovered from the countercurrent water scrubbing of char fines-free product gas will normally be less than about 10 ppm. The phenol concentration of flue gas scrubber water obtained in like manner will be substantially less than 10 ppm. These low phenol levels result from injecting the feed coal into the bottom of the gasifier. Because of the low injection point, the residence time of organic volatiles, including phenols, produced during gasification is sufficient to allow the volatiles to crack or otherwise react. If, however, the feed coal is injected at higher levels in the fluidized bed or upsets occur during gasification resulting in low bed levels, the concentration of phenol and other organic contaminants in the product gas scrubber water will drastically increase.

In addition to phenol, the scrubber waters may contain numerous other dissolved and suspended organic compounds. For example, the scrubber water recovered from the countercurrent scrubbing of char fines-free product gas generated during the gasification of certain Wyodak coals may contain in solution compounds such as indole, quinoline, methyl pyridine, naphthalene, and phenols such as naphthol, cresol, resorcinol and other hydroxy derivatives of benzene and its condensed nuclei. When the gasification is carried out under normal conditions, these organic compounds will usually be found in relatively small quantities. Nevertheless, the flue gas and product gas scrubber waters normally cannot be discharged into the environment without treatment to remove at least a portion of these oganic contaminants along with sulfur and nitrogen compounds absorbed during the scrubbing process.

In the process depicted in FIG. 1 the char fines in the slurries formed in circulating water pumparound systems 47 and 62 will behave similarly to activated carbon and will adsorb at least a portion of the phenols and other organic contaminants dissolved or suspended in the scrubber waters. This behavior is expected because the gasification process taking place in gasifier 15 is similar to processes used in producing activated carbon. Also, the fines produced in the gasifier and transfer line burner have a high surface area and contain relatively large amounts of carbon as indicated by the data set forth below in Table II.

TABLE II

| Elemental Analyses of Coal and Char Fines | | | | |
|---|---|---|---|---|
| Weight % (Dry Basis) | Wyodak Coal | Char Fines | Illinois No. 6 Coal | Char Fines |
| Carbon | 68.5 | 61.9 | 69.8 | 69.3 |
| Hydrogen | 4.8 | 0.8 | 5.1 | 0.6 |
| Oxygen | 17.1 | 3.7 | 10.0 | 3.0 |
| Nitrogen | 0.9 | 0.30 | 1.1 | 0.4 |
| Sulfur | 0.5 | 0.10 | 4.4 | 0.05 |
| Ash | 8.2 | 33.2 | 9.5 | 26.6 |
| Surface Area $M^2/g$ | — | 294 | — | 331 |
| Pore volume, $cm^3/g$ | — | 0.37 | — | 0.10 |

The degree of adsorption by the char fines of certain organic contaminants may be substantially affected by the pH of the scrubber water slurry. The nonionized form of an organic compound in solution is more readily adsorbed by activated carbon than is the ionized form. Therefore the adsorption of organic acids, those substances which dissociate in solution into hydrogen ions and organic anions, may be adversely affected by the pH or hydrogen ion concentration of the solution.

The extent of dissociation of a particular organic acid in an aqueous solution can be characterized by considering the dissociation constant of that acid. The equilibrium for dissociation is governed by the following expression:

$$HA \rightleftarrows H^+ + A^-$$

where H⁺ represents a hydrogen ion and A⁻ is any organic anion. From the above equation the HA dissociation is defined as $$[H^+][A^-]/[HA] = K_a$$

where the concentrations are expressed in moles per liter and $K_a$ is the dissociation constant. This expression may be rearranged as follows:

$$[A^-]/[HA] = K_a/[H^+]$$

The above equation defines the ratio of the anion concentration to the concentration of nonionized molecules. This ratio reflects the degree of dissociation of HA molecules. If the ratio is small, the more adsorbable nonionized HA molecules will predominate and subsequently all HA will be adsorbed. If the ratio is large, however, the predominant species will be the anion and therefore less adsorption will be expected. To obtain substantial or near complete adsorption of HA the ratio will be at most about 0.1, preferably about 0.01 or less.

HA may represent, among others, any organic acid such as benzoic acid, naphthoic acid, and similar carboxylic acid; any substance in the general class of compounds known as phenols such as phenol, naphthol, cresol, resorcinol, hydroquinone; and any other hydroxy derivative of benzene and its condensed nuclei.

The following is a mathematical illustration of how the pH of the scrubber water or any aqueous solution can affect the adsorption of phenol. The equation for the dissociation of phenol in an aqueous solution can be written as $$\phi OH \rightleftharpoons \phi O^- + H^+$$

the equilibrium or dissociation constant is defined as:

$$K_a = 1.1 \times 10^{-10} = [\phi O^-][H^+]/[\phi OH]$$

The concentration ratio of phenoxide ion to phenol is found by rearranging the above expression $$[\phi O^-]/[\phi OH] = K_a/[H^+] = 1.1 \times 10^{-10}/[H^+]$$

Assuming the pH to be 8.0 then:

$$[H^+] = 10^{-8} \text{ and } [\phi O^-]/[\phi OH] = 1.1 \times 10^{-10}/10^{-8} = 0.011$$

Thus, at a pH of 8.0 there are approximately 100 times as many nonionized phenol molecules in solution as there are phenoxide ions and the adsorption of phenol will be near the optimum. If, however, the pH is 10.0, then $[H^+] = 10^{-10}$ and $$[\phi O^-]/[\phi OH] = 1.1 \times 10^{-10}/10^{-10} = 1.1$$

This value for the concentration ratio indicates that about 50% of the phenol is in the less adsorptive ionized form and adsorption of substantially all the phenol cannot be expected.

It will be noted from the above analyses that the adsorption of substantially all phenol or other organic acid that dissociates in solution into hydrogen ions and organic anions can be obtained by adjusting the pH of the aqueous solution so that the concentration ratio, $K_a/[H^+]$, is small, preferably less than about 0.01. Frequently there will be several organic acids present in solution and removal of them all will be desirable. If this is the case, the largest dissociation constant of the organic acids present is used to calculate the pH that will yield optimum adsorption of all the acids.

The dissociation constants for several substances falling in the general class of compounds known as phenols are set forth below in Table III.

TABLE III

| Dissociation Constants for Phenols* | |
|---|---|
| Compound | Dissociation Constant ($K_a$) |
| Phenol | 1.1 × 10⁻¹⁰ |
| o-Cresol | 6.3 × 10⁻¹¹ |
| m-Cresol | 9.8 × 10⁻¹¹ |
| p-Cresol | 6.7 × 10⁻¹¹ |
| Catechol | 1 × 10⁻¹⁰ |
| Resorcinol | 3 × 10⁻¹⁰ |
| Hydroquinone | 2 × 10⁻¹⁰ |
| o-Fluorophenol | 1.5 × 10⁻⁹ |
| o-Chlorophenol | 7.7 × 10⁻⁹ |
| o-Bromophenol | 4.1 × 10⁻⁹ |
| o-Iodophenol | 3.4 × 10⁻⁹ |
| m-Nitrophenol | 5.0 × 10⁻⁹ |

*R. Morrison and R. Boyd, "Organic Chemistry", Allyn and Bacon, Boston, 1954, p. 586.

As can be seen from Table III, the dissociation constants of the listed phenols vary between about $10^{-9}$ and about $10^{-12}$. To insure substantially complete adsorption of these phenols from a solution which may contain one or more of them, the pH of the solution should be maintained at about 7.0 so that the ratio of the highest possible dissociation constant, about $10^{-9}$, to the hydrogen ion concentration, $10^{-7}$, will be about 0.01.

As previously stated, the pH of the product gas scrubber water obtained by the countercurrent scrubbing of char fines-free product gas with water in a packed column will normally range from about 8.0 to about 9.0. Flue gas scrubber water obtained by the countercurrent scrubbing of char fines-free flue gas in like manner, on the other hand, will have an acidic pH. In the process depicted in FIG. 1, both the flue gas and product gas will contain char fines when they pass respectively through venturi scrubbers 46 and 61 and therefore both the flue gas scrubber water exiting circulating water pumparound unit 47 and the product gas scrubber water exiting circulating water pumparound system 62 will contain char fines. As stated previously, these char fines will adsorb phenols and other organic contaminants in the scrubber waters. It has been found that the pH of the flue gas and product gas scrubber waters substantially increases thereby decreasing the degree of adsorption when char fines derived from the gasification of certain types of coal or similar carbonaceous material are present in the scrubber waters.

Char fines produced during the gasification of a coal or carbonaceous material having a relatively large amount of calcium, magnesium, potassium and sodium containing mineral constituents will have a substantial effect on the pH of the flue gas and product gas scrubber waters. When such a coal is gasified and its char fines are therefore present in the scrubber waters, the flue gas scrubber water slurry will be at least somewhat basic instead of acidic and the pH of the product gas scrubber water slurry will normally be about 9.0 or above.

The increase in pH is apparently due to the hydrolysis of some of the magnesium, calcium, potassium, and sodium containing compounds present in the char fines. The amount of these caustic constituents in the char fines will depend on the mineral content of the raw coal. It is difficult to determine the amount and types of the various mineral constituents of the raw coal. The most common and widely used method is to ash or completely burn the coal under standardized conditions and analyze the resultant ash residue. The standard procedures used to ash the coal will be familiar to those skilled in the art. Although the ash analysis is used to characterize the mineral content of the coal from which the ash is derived, the ash composition does not represent the original mineral content of the coal as it undergoes changes during combustion. The compounds found in ash are normally reported as oxides but actually occur largely as a mixture of silicates, oxides, sulfates and small amounts of other substances. The standard format for reporting coal ash analyses is shown in the lower part of Table I above.

Studies indicate in general that the pH of the char fines-scrubber water slurries will be of such a magnitude as to deleteriously affect adsorption when the fines are produced during the gasification of a coal or similar carbonaceous material whose ash contains a total of at least 15 weight percent calcium, magnesium, potassium and sodium expressed as oxides on a moisture-free basis. Since the mineral content of the different types of coals varies widely, it is not possible without ash analyses to accurately specify which coals will yield caustic char fines, those fines which will increase the pH of the scrubber waters so as to have a deleterious affect on adsorption.

After the slurries are formed in the venturi scrubbing systems of the process shown in FIG. 1, they are passed into line 65 via lines 48 and 63 respectively and the combined slurry is fed to stripper 66. The pH of the combined slurry formed during the gasification of a coal that yields noncaustic char fines will normally be in the range from about 8.0 to about 9.0. The acidic flue gas scrubber water will have little effect on the pH of the combined slurry because of the buffering action of ammonium carbonate and ammonium bicarbonate present in the product gas scrubber water. The pH of the combined slurry formed during the gasification of a coal that yields caustic char fines, on the other hand, will normally range from about 9.0 to about 11.0.

The combined scrubber water slurry is contacted in stripper 66 with steam or other stripping gas introduced into the system through line 67. The stripping gas removes hydrogen sulfide, carbon dioxide, hydrogen cyanide, ammonia and other dissolved gases from the scrubber water and carries them overhead through line 68, from which the gas may be passed to a gas incineration unit or other downstream facilities designed to permit eventual disposal or recovery of these compounds without atmospheric pollution.

The removal of dissolved gases by the stripping action within vessel 66 will cause the pH of a noncaustic char fines slurry to decrease. Such a slurry removed from the bottom of stripper 66 via line 69 will normally have a pH of about 7.0 or somewhat lower. As previously discussed a pH of this magnitude will insure near complete adsorption by the char fines of phenols and other organic acids having dissociation constants of $10^{-9}$ or smaller. The pH of a caustic char fines slurry, on the other hand, will not change substantially as dissolved gases are removed during passage through the stripper. This phenomenon is evidently caused by the continuous hydrolysis of the caustic constituents in the char fines. Thus, the pH of a stripper bottoms slurry produced during the gasification of a coal whose ash contains a total of at least 15 weight percent calcium, magnesium, potassium and sodium expressed as oxides on a moisture free basis will normally be about 9.0 or above. As discussed previously, pH values in this range will result in the increased dissociation and decreased adsorption of phenols and other organic acids present in the stripper bottoms slurry. To obtain substantial or near complete adsorption of the phenols and other organic acids having dissociation constants of about $10^{-9}$ or below, sufficient mineral acid is added through line 71 to the stripper bottoms slurry in vessel 70 to lower the pH to about 7.0.

The rate and extent of ammonia removal during stripping may be affected considerably by the pH in the stripper. A pH of from about 8.0 to about 9.0 is optimum for removal of ammonia by steam stripping. It thus may be necessary to add a base to a noncaustic char fines slurry entering the stripper to maintain the pH between about 8.0 and about 9.0 during the stripping process. Addition of a base, if necessry, will increase the pH of the noncaustic char fines bottoms slurry exiting vessel 66. It will, therefore, be necessary to adjust the pH of the bottoms slurry to insure near complete removal of phenols and other organic acids by the char fines. Thus, even though the particular coal being gasified may produce noncaustic char fines, a pH adjustment may be required in mixing vessel 70.

After the stripper bottoms slurry is neutralized in mixing vessel 70, it is passed through line 72 to rotary filter or similar device 73 where the char fines containing adsorbed phenols and other contaminants are removed. Wash water is supplied to the filter via line 74 and char fines are removed via line 75. The fines may be disposed of by land fill or other means. The water from which the fines have been removed is withdrawn from the filter through line 76. This water will normally have a pH of about 7.0 and will be essentially depleted of phenols and other organic contaminants. The water may be recycled to the gasification system, used for other purposes, or discharged into the environment.

The embodiment of the process of the invention disclosed above is one in which substantially complete removal of phenols and other organic acids having dissociation constants of about $10^{-9}$ or below is obtained from waste scrubber water produced during the gasification of coal or similar carbonaceous materials. The scrubber water to be purified is contacted with caustic char fines derived from the gasification of a carbonaceous material and the pH of the resultant basic slurry is lowered to about 7.0. This pH adjustment guarantees that phenols and other organic acids will be present in their more adsorbable, nonionized form and thus insures near complete adsorption by the char fines which behave similarly to activated carbon. The actual contacting of the char fines with the scrubber water is inherent in the process flow scheme.

It will be understood that the process of the invention is not restricted to the embodiment disclosed above and can be applied to processes in which any waste water containing phenols or other organic acids including mercaptans is contacted with any char derived from a carbonaceous material whose ash contains a total of at least 15 weight percent calcium, magnesium, potassium and sodium expressed as oxides on a moisture-free basis. The waste water may originate from many different sources such as the aqueous effluent from municipal sewage treatment plants, refineries, chemical plants, liquefaction plants and similar industrial installations. The char utilized as the adsorbent may be any carbonaceous product that has a high content of caustic material and is derived from the thermal processing of the appropriate carbonaceous material in those cases where that material is not completely consumed or converted such as in carbonization, pyrolysis or liquefaction. The size of the char particles may vary considerably. The particles may, for example, be fines such as those utilized in the embodiment disclosed above, they may be larger in size such as those particles removed in the dip legs from separators 39, 42, 51 and 54 shown in FIG. 1, or they may be the size of the larger char particles in the fluidized bed of the gasifier.

The process depicted in FIG. 2 is an embodiment of the invention in which waste water is treated with char produced during the fluid bed gasification of a carbonaceous material whose ash contains a total of at least 15 weight percent calcium, magnesium, potassium and sodium expressed as oxides on a moisture-free basis. In the process depicted in FIG. 2, waste water having a pH of about 7.0 and containing phenols and other dissolved or suspended organic contaminants including mercaptans is passed into separator 78 via line 77. If necessary, a coagulating agent such as alum or the like is passed through line 79 into the raw waste water in line 77. The waste water is allowed to stand in the separator for 30 to 90 minutes in order to permit suspended solids to settle. Floatable oil and other insoluble material is removed from the top of the separator by conventional means, such as a rotating skimming device, and is withdrawn through line 80. Solid particles in the waste water such as salt, fibers, tar and the like, settle to the bottom of the separator and are removed in the form of sludge through line 81. Ambient conditions will normally be utilized in the separator.

The separator effluent, depleted in suspended material, is passed through line 82 to the bottom of contactor 83 where it is passed upwardly through a downflowing aqueous slurry of char particles. The char behaves similarly to activated carbon and adsorbs any residual amounts of suspended organic material along with dissolved phenols and other organic contaminants.

The downflowing slurry of char particles is formed in vessel 89 where water having a pH of about 7.0 is injected via line 84 and mixed with dry char particles passed into the vessel through line 56. Water is added in such an amount as to form an easily pumpable slurry, normally one containing about 5 weight percent char particles. Char suitable for use in forming the slurry may be any carbonaceous product which is derived from the thermal processing of a carbonaceous material whose ash contains a total of at least 15 weight percent calcium, magnesium, potassium and sodium expressed as oxides on a moisture-free basis in those cases where the carbonaceous material is not completely consumed or converted such as in carbonization, gasification, pyrolysis or liquefaction. In the process depicted in FIG. 2, the char used is that removed by separators 51 and 54 from the product gas produced in gasifier 15 of FIG. 1. Valve 58 is closed and the char particles in dip legs 52 and 55 are combined and passed through valve 59 and line 56 to vessel 89 shown in FIG. 2. The use of char produced in the gasification process depicted in FIG. 1 or a similar process as an adsorbent to treat waste water originating elsewhere enhances the economics of the gasification process by utilizing the unconverted carbon remaining in the char particles.

The pH of the slurry formed in vessel 89 will normally be above about 9.0. This unexpectedly high pH is evidently caused by the high level of caustic material in the char. The caustic compounds are leached from the char and hydrolyzed by the water. As discussed previously, a high pH will have a deleterious effect on the adsorption of phenols and other organic acids which dissociate in solution to form hydrogen ions and organic anions. To obtain substantial or near complete adsorption of these compounds by the char during contacting in vessel 83, sufficient mineral acid is added to the slurry through line 86 to substantially decrease the pH in contactor 83.

The pH level desired in the contactor will depend on the value of the dissociation constants of the organic acids which are to be removed by adsorption onto the char. The pH will be maintained so that the ratio of the highest dissociation constant of the organic acids present whose removal is desired to the hydrogen ion concentration is at most about 0.1, preferably about 0.01 or less. If the organic acids to be removed include only phenol or similar compounds listed in Table III above, a pH of about 7.0 is desirable.

A concentrated slurry of spent char particles is removed from the bottom of contactor 83 via line 87 and may be passed through a filter to separate the solids from the liquid. The solids then may be disposed of in land fill operations with essentially no danger of pollution. The waste water substantially depleted in organic contaminants and containing some char particles is withdrawn from the contactor via line 88. The residual char particles are removed from the water which may then be discharged into the environment or utilized in other industrial processes.

The nature and objects of the invention are further illustrated by the results of laboratory tests. The first series of tests illustrates the surprising caustic nature of Wyodak char fines. The second series of tests illustrates the Wyodak char fines perform poorly as an adsorbent unless the pH of the char fines slurry is properly adjusted.

In the first series of tests, four 3-liter round bottom flasks were filled with 750 ml of product gas scrubber water obtained by scrubbing the product gas produced during the gasification of coal in a coal gasification pilot plant generally similar to that shown in FIG. 1. The product gas scrubber water used did not contain any char fines, these having been separated from the product gas by cyclones and gas filters upstream of the scrubber. Two of the flasks were filled with product gas scrubber water produced during the gasification of a Wyodak coal while the other two flasks contained product gas scrubber water produced during the gasification of an Illinois No. 6 coal. Thirty-seven and one-half grams of Wyodak char fines recovered by gas filters from the overhead gas stream exiting the product gas secondary cyclone separator (line 60 in FIG. 1) were added to one of the flasks containing Wyodak product gas scrubber water and 37½ grams of Illinois No. 6 char fines obtained in like manner were added to one of the flasks containing Illinois product gas scrubber water. The contents of each of the flasks were then subjected to boiling for a 4-hour period. During this boiling the volume of water in the flasks was kept constant by adding fresh distilled water to replace the liquid that was vaporized. After 4 hours of boiling, the pH of the aqueous bottoms remaining in the flasks was measured. The results of these tests are set forth in Table IV below.

TABLE IV

The pH of Steam Stripped Scrubber Water Slurries

| Type of Scrubber Water | Type of Char Fines | pH of Flask Bottoms |
|---|---|---|
| Wyodak Product Gas | None | 7.4 |
| Wyodak Product Gas | Wyodak | 9.7 |
| Illinois Product Gas | None | 6.6 |
| Illinois Product Gas | Illinois | 7.0 |

It can be seen from Table IV that Illinois No. 6 char fines have little effect on the pH of the scrubber water slurry whereas Wyodak char fines significantly increase pH. It is believed that this surprising and unexpected effect on pH is due to the high level of caustic material in the Wyodak char fines. The analyses of the ash derived from the Wyodak and Illinois No. 6 char fines used in the above-described experiment are set forth below in Table V.

TABLE V

Analyses of Char Ash

| Ash Constituent Wt. % Oxides, Dry Ash | Illinois No. 6 Char Fines | Wyodak Char Fines |
|---|---|---|
| $Fe_2O_3$ | 21.8 | 4.3 |
| $SO_3$ | 0.7 | 10.4 |
| $TiO_2$ | 1.5 | 1.5 |
| $P_2O_5$ | 0.2 | 1.1 |
| $SiO_2$ | 46.5 | 24.2 |
| $Al_2O_3$ | 21.1 | 15.6 |
| CaO | 2.4 | 33.1 |
| MgO | 1.2 | 7.3 |
| $K_2O$ | 2.0 | 0.1 |
| $Na_2O$ | 0.2 | 0.4 |
| Total CaO, MgO, $K_2O$ and $Na_2O$ | 5.8 | 40.9 |

It can be seen from Table V that the ash derived from the Wyodak char fines contains a total of 40.9 weight percent CaO, MgO, $K_2O$ and $Na_2O$ whereas the Illinois No. 6 char ash contains only 5.8 weight percent. The slurry water apparently hydrolyzes the calcium, magnesium, potassium and sodium compounds in the char fines, thereby substantially increasing the pH of the Wyodak slurry. In general, this same phenomenon will be expected when any char derived from a coal whose ash contains a total of at least 15 weight percent, calcium, magnesium, potassium and sodium expressed as oxides on a moisture-free basis is slurried with water.

In the second series of tests, four separate solutions of phenol in distilled water were prepared so that the phenol concentration was 950 ppm. Wyodak char fines were then added to two of the solutions and Illinois No. 6 char fines to the remaining two. In each case enough char was added to form slurries having 5 weight percent fines. The slurries were stirred at ambient temperature for 30 minutes and then filtered. The filtrate was analyzed for phenol by the 4 aminoantipyrene test and the results cross-checked by ultraviolet analyses. The amount of phenol adsorbed by the char was determined by subtracting the amount of phenol found in the filtrate from the amount originally in solution. The char fines containing the adsorbed phenol were then subjected to a Soxhlet (continuous solid-liquid) extraction at 75° C. and at 100° C. The resulting extractates were analyzed for phenol and the results normalized to the original slurry weight. This was done to determine the amount of phenol which would remain adsorbed on the fines under severe conditions. The results of these experiments for both the Illinois and Wyodak char fines slurries are shown in Table VI below.

TABLE VI

Phenol Adsorption on Char Fines

| Type of Char Fines | Run | Phenol Initially Adsorbed (ppm) | Percent Adsorption* | Extraction Temp. (° C.) | Phenol Extracted after 20 Hrs. (ppm) | Percent Extraction** | Total Phenol Adsorbed ppm | Total Phenol Adsorbed %* |
|---|---|---|---|---|---|---|---|---|
| Illinois No. 6 | 1 | 947.2 | 99.7 | 100° | 34.8 | 3.7 | 912 | 96.5 |
|  | 2 | 945.8 | 99.5 | 75° | 8.0 | 0.9 | 938 | 98.7 |
| Wyodak | 1 | 783 | 82.4 | 100° | 284 | 36.6 | 499 | 52.5 |
|  | 2 | 800 | 84.2 | 75° | 143 | 17.9 | 657 | 69.2 |

*Based on initial phenol concentration of 950 ppm.
**Based on amount initially adsorbed.

It can be seen from Table VI that Illinois No. 6 char fines are capable of initially removing almost all the phenol from solution and are also able to retain all but a few percent after aqueous extraction at elevated temperatures. The adsorption performance of the Wyodak fines, on the other hand, is far inferior to that of the Illinois No. 6 char fines. Initial adsorption is about 20 percent lower and total adsorption, depending on the extraction temperature, is from about 30 to about 50 percent lower. This disparity in adsorption performance could not be explained by differences in carbon content or in surface area since the values of these parameters are nearly equal as is indicated in Table II above. Further studies revealed that the pH levels of the Illinois No. 6 char fines-distilled water slurries ranged from about 6.0 to about 7.0 whereas the pH levels of the Wyodak slurries were always about 10.0 or greater. The basicity of the Wyodak slurries apparently caused the poor adsorption performance by increasing the dissociation of the phenol which, in turn, decreased the proportion of phenol in the nonionized and more adsorbable form.

The following described tests illustrate that the adsorption performance of Wyodak char fines is substantially enhanced by a proper pH adjustment. Three equal volume solutions of phenol in distilled water were prepared, each containing 960 ppm phenol. Wyodak char fines were added to the solutions in an amount sufficient to form 5 weight percent slurries. Untreated fines were added to two of the solutions, pretreated fines to the other. The pretreated fines were prepared by adding sulfuric acid to a slurry of untreated Wyodak fines and distilled water and then washing the fines with distilled water until the filtrate's pH was between 6.0 and 7.0. The three slurries were then stirred at ambient temperature for 30 minutes and filtered. During the stirring, sulfuric acid was added to one of the slurries containing untreated fines to maintain the pH at about 7.0. The filtrate from each slurry was then analyzed for phenol and the amount of phenol initially adsorbed by the char was determined by difference. The char fines were then subjected to a Soxhlet extraction for 20 hours at 75° C. The resulting extractates were analyzed for phenol and the results normalized to original slurry weight. The

TABLE VII
Effect of pH on Phenol Adsorption by Wyodak Char Fines

| Type of Slurry Treatment | Phenol Initially Adsorbed (ppm) | Percent Adsorption | Phenol Extracted after 20 hrs. at 75° C., (ppm) | Percent Extracted** | Total Phenol Adsorbed ppm | %* | $\%\left(\dfrac{69}{58}\right)$*** |
|---|---|---|---|---|---|---|---|
| None | 682 | 71 | 126 | 18.5 | 556 | 57.9 | (68.8) |
| Slurry acidified with H₂SO₄ during stirring | 917 | 95.3 | 120 | 13.1 | 798 | 79.8 | (94.9) |
| Fines acidified with H₂SO₄ before slurry with phenol solution formed | 908 | 94.5 | 100 | 11.0 | 808 | 80.8 | (96.1) |

*Based on initial phenol concentration of 960 ppm.
**Based on amount initially adsorbed.
***Chemical analysis showed that the Wyodak fines used in these tests contained 58% carbon. This column takes this fact into account so that the adsorption performance can be compared to that of the Illinois No. 6 char fines (69% carbon) used in the adsorption experiments whose results are reported in Table VI above.

The results of these experiments indicate that a proper pH adjustment increases the adsorptive capacity of the Wyodak char fines approximately 20 to 25 percent, both initially and after extraction, regardless of whether that adjustment is obtained by pretreating the fines with mineral acid or adding the acid directly to the slurry of char fines. The adsorption performance of the Wyodak fines after proper pH adjustment can be compared to the adsorption performance of the Illinois char fines reported in Table VI above by taking into account the higher carbon content of the Illinois fines. The Illinois fines contain 69 percent carbon whereas the Wyodak fines contain 58 percent. By mulitplying the values for percent total adsorption found in Table VII by the ratio 69/58, it can be seen that the adsorption by the Wyodak fines afte proper pH adjustment approaches that the Illinois fines.

I claim:

1. A process for the substantially complete removal from waste water of an organic compound whose molecules dissociate in solution to produce organic anions and hydrogen ions comprising:
   (a) contacting said waste water in a contacting zone with char derived from the thermal processing of a carbonaceous material that yields an ash containing a total of at least 15 weight percent calcium, magnesium, potassium and sodium expressed as oxides on a moisture-free basis when completely burned;
   (b) maintaining the pH of the resultant aqueous slurry in said contacting zone at a value such that the ratio of the dissociation constant of said organic compound to the hydrogen ion concentration of said slurry is less than about 0.1; and
   (c) recovering said waste water depleted in said organic compound from said contacting zone.

2. A process as defined in claim 1 wherein said organic compound comprises phenol.

3. A process as defined in claim 1 wherein said organic compound comprises a hydroxy derivative of benzene and its condensed nuclie.

4. A process as defined in claim 1 wherein said waste water comprises an aqueous effluent from a gasification plant.

5. A process as defined in claim 1 wherein said char is derived from the gasification of a subbituminous coal.

6. A process as defined in claim 1 wherein said char is derived from the gasification of a bituminous coal.

7. A process as defined in claim 1 wherein said pH is maintained at said value by adding mineral acid directly to said slurry in said contacting zone.

8. A process as defined in claim 1 wherein the ratio of said dissociation constant to said hydrogen ion concentration is less than about 0.01.

9. A process for the substantially complete removal from waste of organic compounds whose molecules dissociate in solution to produce organic anions and hydrogen ions comprising:
   (a) contacting said waste water in a contacting zone with char derived from the thermal processing of a coal that yields an ash containing a total of at least 15 weight percent calcium, magnesium, potassium and sodium expressed as oxides on a moisture-free basis when completely burned;
   (b) maintaining the pH of the resultant slurry in said contacting zone at a value such that the ratio of the highest dissociation constant of said organic compounds to the hydrogen ion concentration of said slurry is less than about 0.01; and
   (c) recovering said waste water depleted in said organic compounds from said contacting zone.

10. A process as defined in claim 9 wherein said organic compounds comprise hydroxy derivatives of benzene and its condensed nuclei.

11. A process as defined in claim 9 wherein the pH of said slurry in said contacting zone is maintained at said value by treating said char with mineral acid before it injection into said contacting zone.

12. A process as defined in claim 9 wherein said organic compounds comprise hydroxy derivatives of benzene and its condensed nuclei having dissociation constants of about $10^{-9}$ and below and the pH of said slurry in said contacting zone is maintained at about 7.0.

13. In a process wherein carbonaceous material that yields an ash containing a total of at least 15 weight percent calcium, magnesium, potassium, and sodium expressed as oxides on a moisture-free basis when completely burned is fed into a high temperature fluidized bed reactor and gasified to produce a char and a synthetic product gas which is then scrubbed with water to form a slurry of char fines and product gas scrubber water containing organic compounds whose molecules dissociate in solution to produce organic anions and hydrogen ions; the improvement which comprises maintaining the pH of said slurry at a value such that the ratio of the highest dissociation constant of said organic compounds to the hydrogen ion concentration of said slurry is less than about 0.1 and recovering said scrubber water depleted in said organic compounds.

14. A process as defined in claim 13 wherein said carbonaceous material comprises a coal.

15. A process as defined in claim 13 wherein said organic compounds comprise organic acids having dissociation constants of less than about $10^{-9}$.

* * * * *